Nov. 9, 1965     C. A. TEICHERT     3,216,281
VARIABLE SPEED DRIVE UNIT
Filed July 2, 1963     5 Sheets-Sheet 1
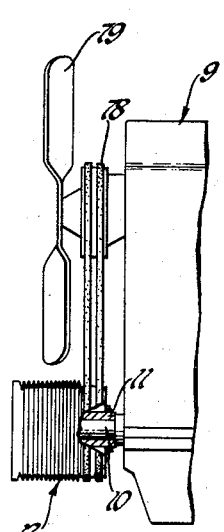
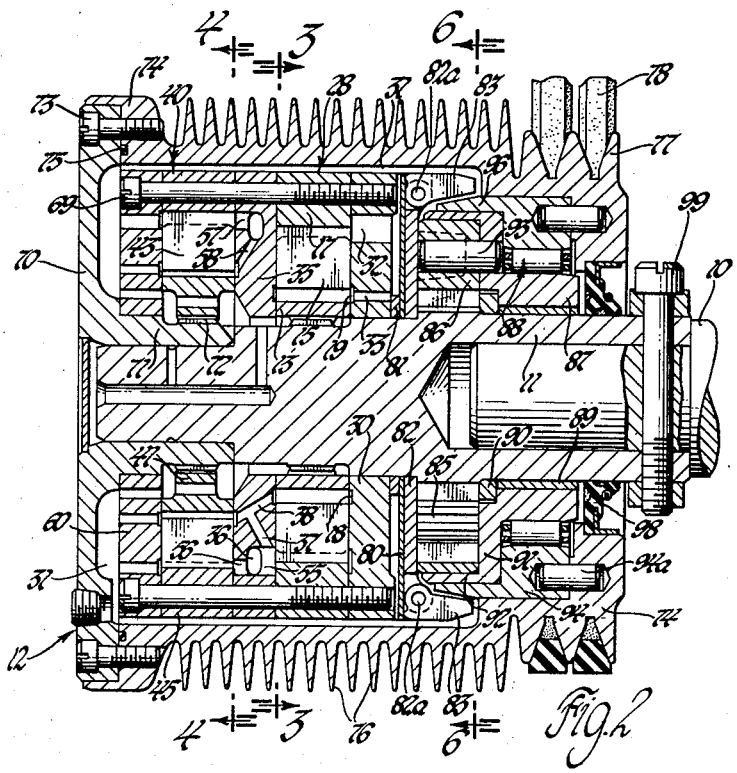
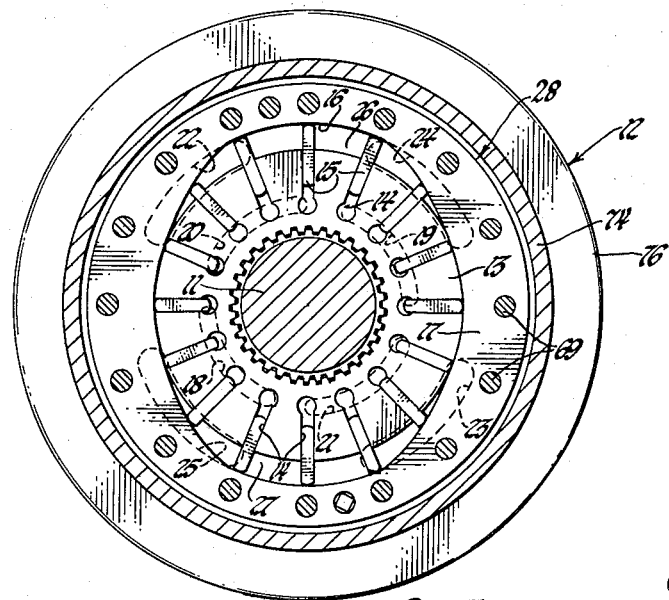
INVENTOR.
Conrad A. Teichert
BY
C. L. Spencer
ATTORNEY

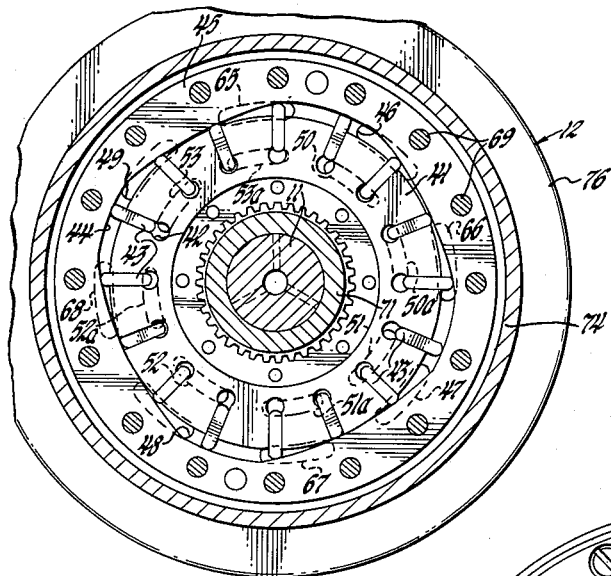

Nov. 9, 1965 C. A. TEICHERT 3,216,281
VARIABLE SPEED DRIVE UNIT
Filed July 2, 1963 5 Sheets-Sheet 3

INVENTOR.
Conrad A. Teichert
BY
R. L. Spencer
ATTORNEY

Nov. 9, 1965

C. A. TEICHERT 3,216,281

VARIABLE SPEED DRIVE UNIT

Filed July 2, 1963

INVENTOR.
Conrad A. Teichert
BY
R. L. Spencer
ATTORNEY

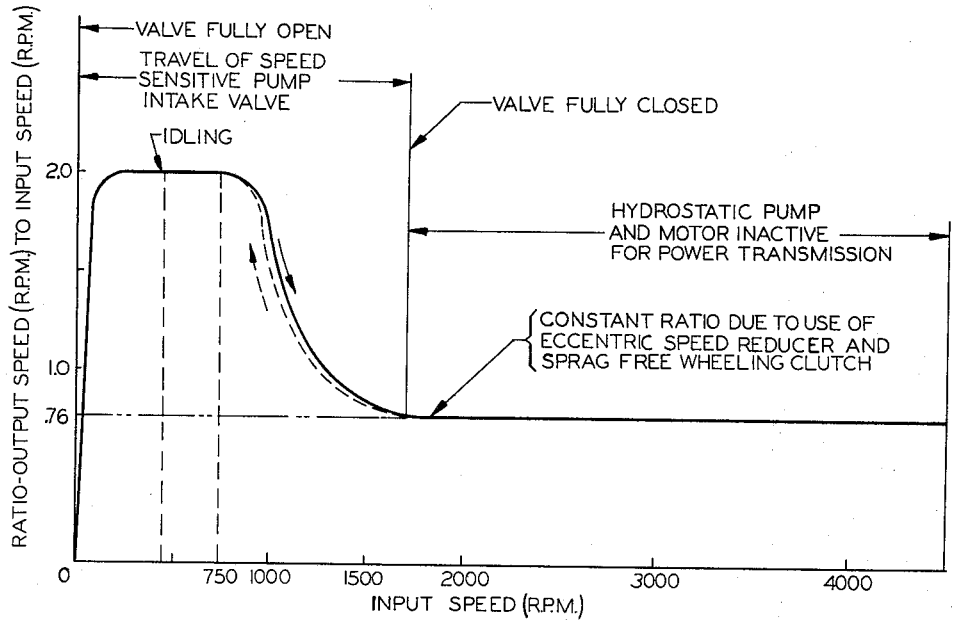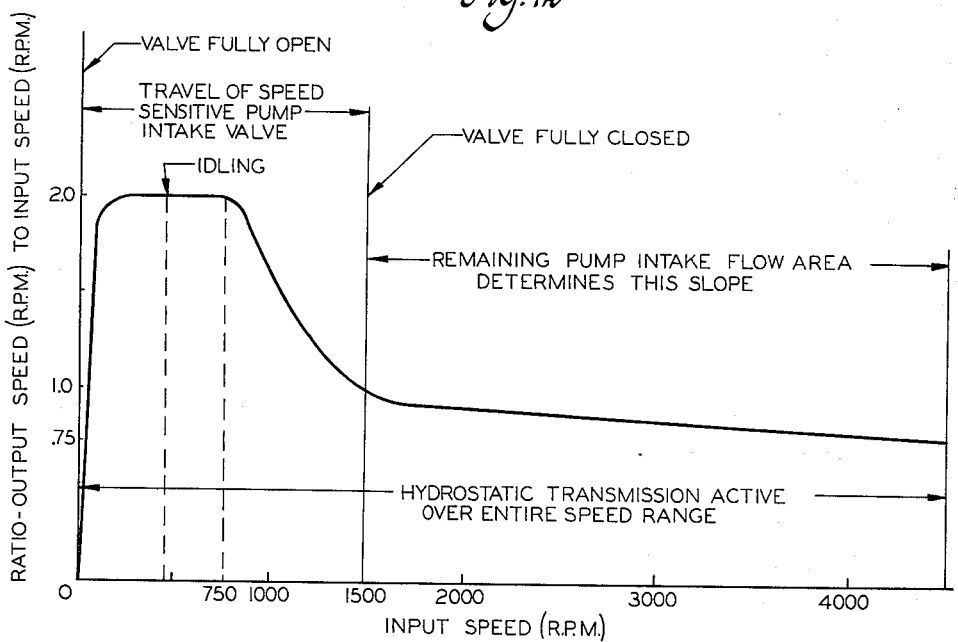

United States Patent Office 3,216,281
Patented Nov. 9, 1965

3,216,281
VARIABLE SPEED DRIVE UNIT
Conrad A. Teichert, Grand Rapids, Mich., assignor to General Motors Corporation, Detroit, Mich., a corporation of Delaware
Filed July 2, 1963, Ser. No. 292,323
14 Claims. (Cl. 74—687)

This invention relates to a variable speed drive unit and more particularly to a variable speed drive unit of compact design including a power delivery housing rotatably supported on a power input shaft and enclosing a pump and motor therein. Valve means are included for controlling the rate of fluid flow to the intake side of the pump to vary the drive ratio. This valve is movable in response to predetermined speed of rotation of the input shaft to restrict fluid flow to the pump to decrease the speed of rotation of the housing relative to input shaft speed as the input shaft speed increases.

Another feature of this invention is to provide a compact variable speed drive unit wherein a housing is rotatably supported upon an input shaft and forms a fluid containing rotating reservoir capable of rapid heat dissipation.

A further feature of this invention is to provide a vane type pump and motor drive assembly wherein the pump cam ring and motor cam ring are fixed to each other to form a freely rotatable assembly.

Still another object of this invention is to provide a variable speed drive unit including a power input shaft, a rotatable power delivery housing rotatably supported on the shaft, a pump and motor disposed within the housing in coaxial relationship for driving the housing and having cam rings fixed to each other and freely rotatable as a unit, and to provide a valve movable to restrict fluid input to the pump to vary the speed of rotation of the motor.

An additional object is to provide mechanical means including a one-way clutch having one race driven by the input shaft and a second race rotatable with the housing effective to drive the housing when the speed of rotation of the housing relative to that of the input shaft reaches a predetermined drive ratio.

Another object of this invention is to provide a power input shaft driven governor effective to move a fluid inlet control valve to decrease the inlet of fluid to the pump in response to increase in speed of rotation of the governor.

These and other objects of this invention will be apparent from the following description and claims, taken in conjunction with the accompanying drawings, in which:

FIGURE 1 is a schematic diagram of a variable speed drive unit embodying the principles of this invention illustrating the drive unit as being driven by a vehicle engine crankshaft.

FIGURE 2 is a longitudinal section through a drive unit illustrating the relationship of the parts within the housing.

FIGURE 3 is a sectional view through the pump taken along the lines 3—3 of FIGURE 2.

FIGURE 4 is a sectional view through the motor taken along the line 4—4 of FIGURE 2.

FIGURE 5 is an end view of the assembly looking toward the motor end plate and illustrating fluid discharge passages in the motor end plate.

FIGURE 6 is a sectional view through the gearing and weights taken along the line 6—6 of FIGURE 2.

FIGURE 12 is a graph illustrating the drive ratio of the units illustrated in FIGURES 2 and 10, which incorporate reduction gearing, as a function of input speed.

FIGURE 13 is a graph illustrating the drive ratio of the embodiment of FIGURE 7, wherein the drive is entirely hydraulic, as a function of input speed.

Figure 7:
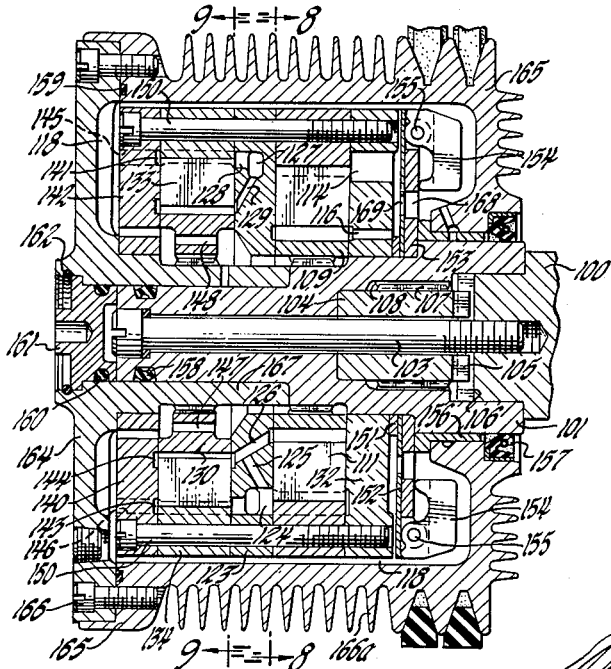
FIGURE 7 is a longitudinal sectional view through an alternate form of assembly wherein the gearing of the arrangement of FIGURE 2 is eliminated.

Referring to FIGURE 1, there is shown an accessory drive unit 12 incorporating the principles of this invention and illustrating a first embodiment of the invention. A power input shaft 11 may be directly secured to the crankshaft 10 of an internal combustion engine 9 so as to be driven at engine speed. Shaft 10 comprises the sole support for the assembly, there being no other static connection to the engine or vehicle.

As shown in FIGURE 2, power input shaft 11 extends into the assembly to rotatably support the assembly thereon. As best shown in FIGURE 3, a pump rotor 13 driven by shaft 11 is provided with a series of slots 14 for receiving pump vanes 15, there being sixteen of such slots and vanes. Vanes 15 extend radially outwardly of slots 14 to contact the cam surface 16 of a two-lobe pump cam ring 17. Pump rotor 13 is provided with a pair of spaced arcuate shaped passages 18 and 19 beneath the inner ends of vanes 15 to admit high pressure pump fluid beneath the vanes to force the vanes outwardly into contact with cam surface 16, and a pair of arcuate shaped passages 20 and 21 for release of fluid as the vanes rotate. Cam ring 17 has a pair of spaced arcuate shaped suction passages 22 and 23 and a pair of arcuate shaped pressure discharge passages 24 and 25 formed therein for admitting pressure to and discharge of pressure from the oppositely disposed pumping chambers 26 and 27.

As best shown in FIGURE 2, a pump end plate 30 fitted closely adjacent to one side of the pump admits pump suction fluid from a reservoir 31 to pump intake passages 22, 20 and 21, 23 through suitable passages, two of which are shown at 32 and 33. A second pair of passages (not shown) similar to passages 24 and 25 are provided in end plate 30 to hydraulically balance the pump. High pressure fluid discharge from the pump is admitted to an intermediate manifold plate 35 having an annular passage 36 therein. Manifold plate 35 is provided with suitable passages 37 and 38 for admitting pump discharge pressure to arcuate passage 18 beneath the pump vanes. Chamber 19 is similarly connected to pump discharge pressure through a suitable passage (not shown) in manifold plate 35 and connected to annular passage 36.

Adjacent manifold plate 35 is a vane type motor 40 adapted to be driven by fluid discharged by pump 28. Motor 40 includes a motor rotor 41 having slots 42 for receiving motor vanes 43, there being a total of sixteen of such slots and vanes (see FIGURE 4). Vanes 43 extend outwardly from rotor 41 to contact a cam surface 44 of a four lobe motor cam 45. Motor 40 is provided with pump pressure inlet passages 46, 47, 48, 49 adjacent the outer portions of vanes 43 and with pump discharge pressure passages 50, 50a, 51, 51a, 52, 52a and 53, 53a beneath the inner ends of vanes 43, all of these passages being of arcuate shape. Pump discharge pressure is conducted to these arcuate passages through suitable passages in manifold plate 35, including passages 55, 56, 36, 57 and 58 shown, and additional passages, not shown.

Adjacent motor 40 in close proximity to the motor is a motor end plate 60 having passages 61, 62, 63, 64 (see FIGURE 5) extending therethrough to permit pump discharge fluid to flow to reservoir 31. Passages 61, 62, 63 and 64 register with arcuate shaped motor discharge passages 65, 66, 67 and 68 formed in motor end plate 60 (see FIGURE 4). As will be noted, pump end plate 30, pump cam ring 17, manifold plate 35, motor cam ring 45 and motor end plate 60 are all joined together by a series of bolts 69 to form a floating assembly within reservoir 31. An end cover 70 includes an axially extending boss 71 extending into the assembly and supporting input shaft 11. Motor rotor 41 drives end cover 70, through a spline connection 72, and cover 70 is bolted to a housing 74 by a series of bolts 73. An O ring seal 75 is disposed between cover 70 and housing 74 to prevent leakage of fluid from reservoir 31. Housing 74 is formed of good heat conducting material such as aluminum and is provided with a multiplicity of upstanding ribs 76 and a set of power delivery pulleys 77 for driving belt 78 and engine accessories such as a fan 79.

An annular diaphragm spring valve plate 80 is supported upon shaft 11, the valve 80 being separated from pump end plate 30 by means of a spacer 81. A governor support plate 82, mounted upon shaft 11 extends radially outwardly adjacent valve plate 80, there being a series of eight similar flyweights 83 pivotally supported upon governor plate 82 by means of pins 82a and spaced angularly equidistant from each other around the periphery of plate 82 as best shown in FIGURE 6. Spacer 81, diaphragm spring valve plate 80, and governor support plate 82 are all driven at engine speed by shaft 11, these elements having flat surfaces cooperating with flats 84 and 84a formed on shaft 11.

Adjacent governor plate 82 is an eccentric gear 85 driven by shaft 11 and meshing with an eccentric gear 86. An inner race 87 of a one-way clutch 88 is supported for rotation on shaft 11 by means of a bushing 89, there being a spacer 90 disposed between the hub of race 87 and eccentric gear 85. Race 87 includes a radially outwardly extending flange 91 and an axially extending annular boss 92. Gear 86 is pinned to flange 91 by means of a pin 93 and is supported both by flange 91 and at its periphery by boss 92. An outer race 94 is pinned to housing 74 for rotation therewith by means of pins 94a and is shaped to provide an axially extending annular boss 96 contacting boss 92 of the inner race. Thus, the outer race 94 supports the inner race portion 92, which in turn supports eccentric gear 86 to prevent wobble of these rotating parts. A one-way clutch 88, which may be of the sprag type, is disposed between the hub 87 and the hub of the outer race 94 such that outer race 94 may rotate faster than inner race 87, but drive will be through the one-way clutch in the event that the inner race tends to over-speed the outer race. The driving pinion 85 has 22 teeth and the driven pinion 86 has 29 teeth. The reduction ratio of the gearing is the ratio of 22 to 29 or .76 to 1. In the event that drive is through the one-way clutch the output speed will be .76 times input speed. A single dynamic oil seal 98 is disposed between shaft 11 and housing 74 to prevent leakage of oil from the reservoir 31. Since seal 98 is subject only to reservoir pressure which is substantially zero, there is little tendency for oil to leak out past the seal. Also the maximum speed of rotation of seal 98 has been found to be only one-quarter of the input speed, or speed of rotation of shaft 11. Thus, at 4500 r.p.m. engine speed, the operational speed of the oil seal is only 1125 r.p.m. The combination of zero oil pressure acting on seal 98 and low rotational speed of the seal results in a seal of long useful life without requiring service. In the assembly only two seals are required, one static, and only one dynamic.

The reservoir 31 is charged with oil before installation, and permanently sealed. Cooling fins 76 on housing 74 revolve with the pulley housing at output speed and provide a rotating heat exchanger of great capacity. The unitary assembly is mounted on the end of the engine crankshaft in any suitable manner as by a bolt 99, and has no other physical or static connections to the engine or vehicle.

The hydrostatic speed changer incorporates a unique arrangement of pump, pump-motor reaction cam, and motor. The free floating speed changer unit consists of an assembly of pump end plate with its ports, pump cam ring, intermediate manifold plate with its ports, motor cam ring, and motor end plate with its ports. All of these parts are axially aligned and firmly joined together. Both the pump and motor rotor are completely hydraulically balanced. The pump inlet and motor outlet ports communicate with the rotating oil reservoir. The pump pressure delivery ports communicate via the intermediate manifold plate at all times with the motor inlet ports. The pump rotor and motor rotor have the same direction of rotation.

In operation, pump driving torque sets up fluid pressure in the pump chambers, intermediate manifold, and motor inlet chambers. Pump driving torque reacts hydraulically on the two-lobe pump cam ring and tends to move it in the direction of rotation of the pump. The fluid pressure due to the pump driving torque reacts hydraulically on the four-lobe motor cam ring and tends to move it in a direction opposite to the direction of pump rotation. The motor to pump speed ratio is proportional to the number of motor cam lobes to the number of pump cam lobes. In this instance four divided by two. For a speed multiplier ratio of two, chosen, the hydraulic torque loads on the pump and motor cam rings are in balance so that the cam assembly stands still, while the motor rotor rotates at twice the speed of the pump rotor. Since the pump displacement is twice that of the motor, the motor rotates at twice the speed of the pump.

In considering the action of the governor mechanism on valve 80, we have three stages of operation of the speed changing device.

In the first stage, for example, zero to 750 r.p.m. input speed, the diaphragm disc spring valve 80 opposes the action of flyweights 83 with sufficient force to remain fully open so that inlet of fluid to the pump is not restricted. The pump rotor speed varies from zero to 750 r.p.m. and the motor rotor varies from zero to 1500 r.p.m., being twice the pump rotor speed. The sprag clutch is released, and drive is entirely hydraulic.

In the second stage, from 750 to 1500 r.p.m. input speed the governor weights progressively move spring disc 80 toward the pump intake ports with increase of input speed to progressively reduce the pump fluid inlet area, or space between the pump and valve 80 until at 1500 r.p.m. input speed, the pump inlet area is reduced to zero by disc valve 80. The output to input speed ratio in this input speed range gradually reduces from 2 to 1 to .76 to one. The pump and motor cam ring unit stands still and the sprag clutch free wheels. Valve 80 is fully closed at 1500 r.p.m.

In the third stage of 1500 to 4500 r.p.m. input speed, with the pump inlet valve closed, and at .76 to 1 output speed ratio, the one-way or sprag drive clutch locks up and drive is at the fixed ratio of the eccentric gearing or .76 to 1. Thus at 4500 r.p.m. input speed, the output speed is .76 times 4500 or 3420 r.p.m. With the one-way clutch locked up, drive is entirely mechanical at the reduction ratio of the gearing. The pump and motor cam ring unit assembly, now free of hydraulic load, rotates at speeds dictated by mechanical and fluid friction. This unit, of course, is rotating in the fluid reservoir and is subject to fluid drag of fluid in the reservoir.

As a "fail safe" feature, it will be understood that in the event of failure of the hydrostatic transmission for any reason, the pulley 77 and any accessories driven thereby will be driven over the entire input speed range by means of the eccentric gearing speed reducer and the one-way clutch, mechanically, at the reduction ratio of the gearing or .76 times input speed.

Figure 8:
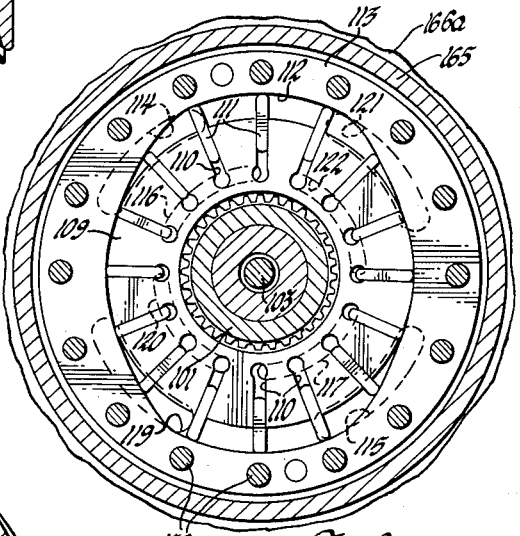
FIGURE 8 is a sectional view through the pump taken along the line 8—8 of FIGURE 7.
Figure 9:
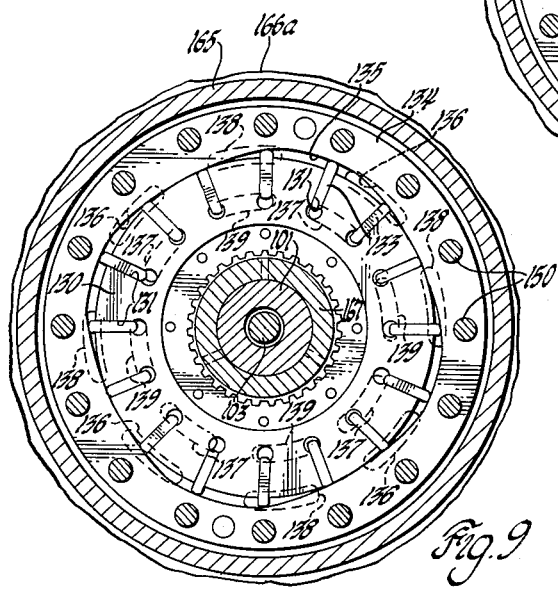
FIGURE 9 is a sectional view through the motor taken along the line 9—9 of FIGURE 7.

In FIGURES 7 through 9 there is shown a second embodiment of the invention wherein the eccentric speed reducer gearing of the first embodiment is eliminated and drive in all three speed ranges is hydraulic.

In this embodiment an engine driven crankshaft 100 receives the power input shaft 101, shaft 101 being piloted on the end of shaft 100. A bolt 103 extends through shaft 101 and a connector 104 within shaft 101 to retain the assembly on shaft 100. Connector 104 is provided with teeth 105 cooperating with teeth 106 on shaft 100 and with splines 107 cooperating with splines 108 on shaft 101 so that input torque from engine shaft 100 is transmitted to input shaft 101 through connector 104. Shaft 101 drives a pump rotor 109 having vane slots 110 (see FIG. 8) and a plurality of vanes 111 disposed in slots 110 and extending radially outwardly to contact the cam surface 112 of a pump cam ring 113. Cam ring 113 is a two-lobe cam ring. A pump end plate 132 is provided with pump inlet ports 114, 115, 116 and 117 to admit fluid from a reservoir 118 to the pump, and with arcuate shaped high pressure passages 119, 120, 121, 122. Pump delivered pressure is conducted to an intermediate manifold plate 123 having a passage 124 for receiving fluid from the pump and for delivering fluid to the motor through passages 124, 125, 126, annual passage 127 and passages 128 and 129.

A motor rotor 130 carries a series of vanes 133 in vane slots 131, the vanes extending outwardly to contact the cam surface 135 of a four-lobe motor cam ring 134. Four sets of arcuate slots 136, 137 supply high pressure fluid to the motor and four sets of slots 138, 139 discharge fluid from the motor. A housing end plate 164 fixed to housing 165 by bolts 166 includes an axially extending boss 167 supported for rotation on shaft 101, the boss being splined to motor rotor 130 so as to be driven by the motor. A motor end plate 140 is provided with a series of arcuate shaped high pressure distribution passages 141, 142, 143, 144 and pressure discharge passages 145, 146, the passages 145, 146 permitting fluid to be discharged from the motor to reservoir 118. Passages 147 and 148 in motor rotor 130 connect the chambers at the opposite sides of the rotor to reservoir 118.

The entire assembly including pump end plate 132, pump cam ring 113, manifold plate 123, motor cam ring 134 and motor end plate 140 are bolted together by a series of bolts 150 to provide a floating subassembly.

Adjacent the side of pump end plate 132 and spaced therefrom axially by a spacer 151 is a diaphragm disc spring valve 152, the valve being supported on shaft 101 and extending radially outwardly from shaft 101. A governor plate 153 pivotally supports a series of flyweights 154 thereon by means of pivot pins 155. Housing 165 is supported for rotation on shaft 101 by means of a bushing 156. Two dynamic oil seals 157, 158 and two static oil seals 159, 160 permit leakage of fluid from the assembly reservoir 118. An end plug 161 carrying seal 160 is fitted in housing end plate 164 and secured thereto by a snap ring 162. Housing end plate 164 is bolted to housing 165 by means of a series of bolts 166. Rotatable housing 165 has formed thereon a series of fins 166a for rapid dissipation of heat.

Governor plate 153, diaphragm spring valve 152 and spacer 151 are all driven by shaft 101 at engine speed, shaft 101 having suitable flats (not shown) formed thereon cooperating with similar flats on these elements to drive them. Governor plate 153 and diaphragm spring valve 152 are each provided with openings 168 and 169, respectively, extending therethrough whereby fluid may enter the pump irrespective of the position of the spring valve 152.

In operation, the second embodiment of the invention is somewhat different from that of the first embodiment.

In a first input speed range of from zero to 750 r.p.m., pump speed varies from zero to 750 r.p.m. and motor speed varies from 0–1500 r.p.m. Pump displacement is twice motor displacement and motor speed is twice pump speed. The floating assembly of the pump and motor cam rings stands still. The diaphragm spring pump inlet valve remains in a substantially fully open position to permit maximum unrestricted flow from reservoir 118 to the inlet side of the pump.

In a second input speed range of from 750 to 1500 r.p.m., the flyweights 154 progressively move diaphragm spring valve 152 toward pump end plate 132 to progressively reduce the diaphragm controlled flow area between the diaphragm spring valve 152 and the pump end plate 132. Thus, the diaphragm controlled fluid inlet area is progressively reduced with increase of input speed until at a speed of 1500 r.p.m. input speed, the variable diaphragm controlled area is reduced to zero. The remaining pump inlet area provided by openings 168 and 169 is of such predetermined fixed value as to reduce the output speed to the input speed. The pump motor cam ring assembly stands still.

In a third input speed range of from 1500 to 4500 r.p.m., diaphragm valve is closed so that only the fixed constant pump inlet area represented by the passages 168 and 169 through the governor plate 153 and diaphragm spring valve 152 is effective to admit fluid to the pump. The pump inlet area is unaffected by the governor action and is of such value as to change the output speed of 1500 r.p.m. at 1500 r.p.m. input speed to 3375 r.p.m. at 4500 r.p.m. input speed. Thus the pump rotor rotates through a speed range of 1500 to 4500 r.p.m. and the motor rotor rotates through a speed range of 1500 to 3375 r.p.m. in this third stage of operation. The diaphragm spring valve 152 is fully closed over the entire third speed range or stage of operation and only a predetermined quantity of working fluid enters the pump through the remaining fixed pump inlet openings. The assembly including the pump and motor cam rings stands still. In its closed position, the diaphragm spring valve contacts the end of pump end plate 132, the outer end of the diaphragm spring valve 152 being moved axially into contact with pump end plate 152 by weights 154 to prevent fluid flow between the valve 152 and pump end plate 132 at the outer peripheral portion adjacent the weights. However, openings 168 and 169 permit restricted flow of fluid to the pump from reservoir 165 after the valve 152 is closed by governor action.

Figure 10:
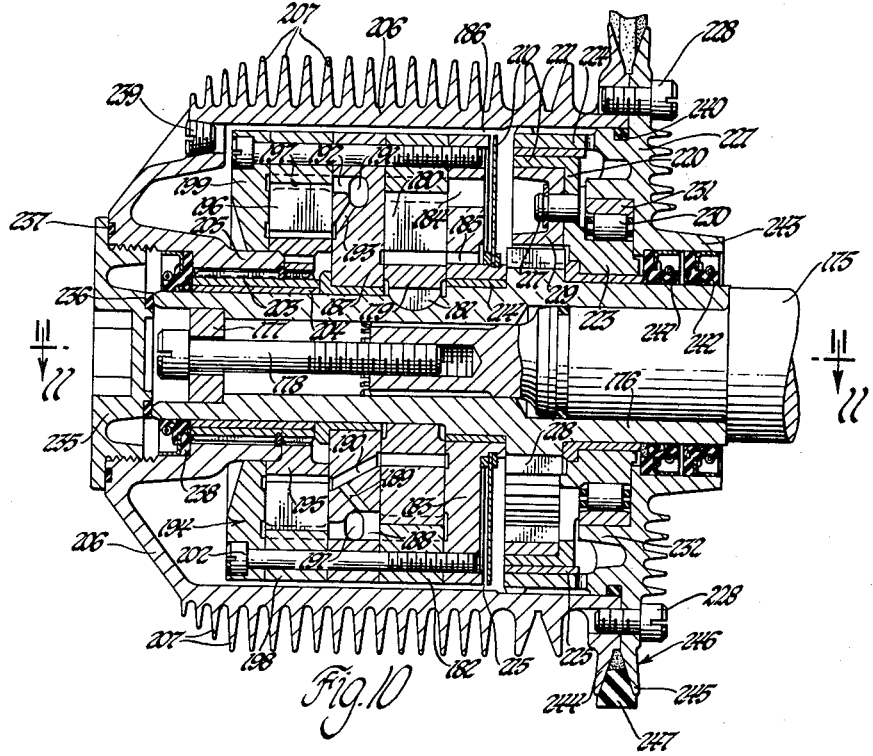
FIGURE 10 is a longitudinal sectional view of a third embodiment of the invention wherein the governor mechanism is eliminated and the control valve is responsive to differential pressure to vary the rate of supply of fluid to the pump.
Figure 11:
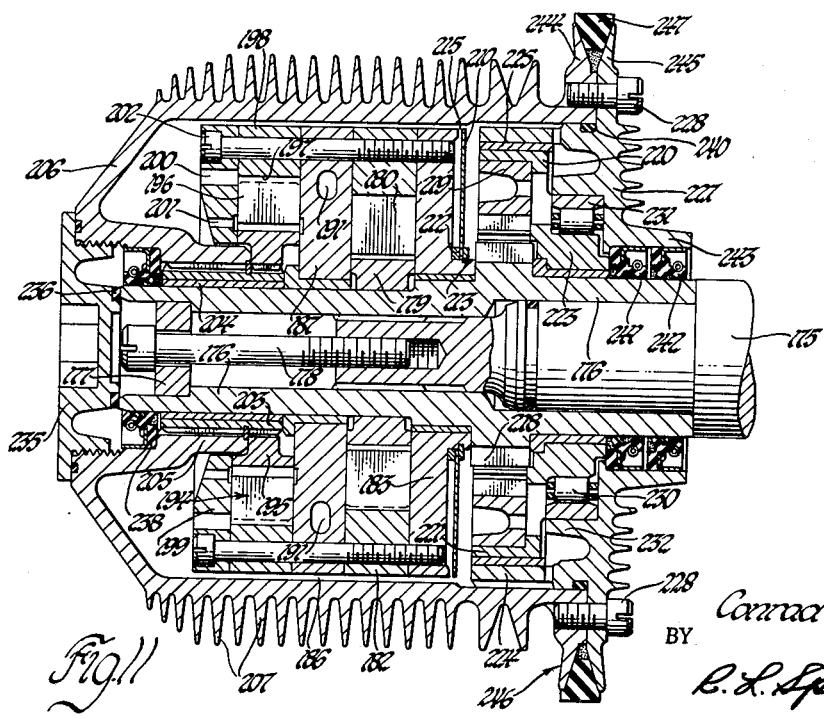
FIGURE 11 is a longitudinal sectional view of the assembly of FIGURE 10, taken at 90 degrees to that of FIGURE 10.

A third embodiment of the invention is shown in FIGURES 10 and 11 which is somewhat similar to the structure of the first embodiment of the invention and wherein the centrifugal flyweight governor is eliminated.

An engine driven power input shaft 175 is piloted into an accessory drive unit power input shaft 176, the shaft 176 being fixed to shaft 175 by means of a bolt 178 and a washer 177. Shaft 176 drives a pump rotor 179 having vanes 180, and also drives an eccentric pinion gear 218. Rotor 179 is keyed to shaft 176 by means of a key 181. Pump vanes 180 cooperate with a two-lobe cam ring 182. A pump end plate 183 is provided with pump suction passages 184 ad 185 for admitting fluid from a reservoir 186 to the pump. An intermediate manifold plate 187 is provided with fluid passages 188, 189, 190, annular passages 191, 192 and 193 for delivering pump pressure fluid to a motor 194. Motor 194 comprises motor rotor 195 having vanes 196 thereon and extending outwardly to contact a four-lobe cam surface 197 of a motor cam ring 198. A motor end plate 199 contains passages 200, 201 (see FIGURE 11) for permitting discharge of fluid from the motor to fluid reservoir 186. Pump end plate 183, pump cam ring 182, manifold plate 187, motor cam ring 198 and motor end plate 199 are all joined together by a series of bolts 202. Motor rotor 195 is splined to a drive sleeve 203 supported for rotation on shaft 176 by means of a bushing 204. Sleeve 203 is splined to an axially extending annular boss 205 of a rotatable housing 206 having cooling fins 207 formed thereon. Housing 206 and fins 207 are formed of aluminum or other good heat conducting material and provide rotating heat rejecting surfaces of large capacity.

A pump intake valve 210 which comprises a disc is fixed to pump end plate 183 by means of a spacer 212 and a snap ring 213, there being a bushing 214 disposed between shaft 176 and end plate 183. A metering gap 215 acts as a flow control orifice for controlling fluid inlet to the pump from reservoir 186.

An inner race 223 of a one-way clutch assembly is driven by an eccentric gear 219, the gear 219 being driven by eccentric gear 218. Race 223 has an upstanding flange 220 and an axially extending annular boss 221 formed thereon, the gear 219 being pinned to flange 220 by means of suitable pins 217. A housing end plate 227 fixed to housing portion 206 by bolts 228 has an axially extending annular boss 224 thereon for retaining a bushing 225 therein, the boss 224 and bushing 225 supporting gear 219 for rotation without wobble. Gear 218 has 24 teeth and gear 219 has 32 teeth to provide a gear reduction of 24 to 32 or .75 to 1. An outer race 231 of the one-way clutch assembly is fixed within an axially extending annular boss 232 for rotation with end plate 227 and a series of one-way clutch elements 230 disposed between inner race 223 and outer race 231 lock up to drive the outer race and housing whenever the speed ratio of output speed to input speed falls to .75 to 1. The eccentric gearing, when effective to drive the housing, drives the housing at three fourths the speed of rotation of input shaft 176.

An end plug 235 carries a thrust washer 236 disposed between the plug and one end of shaft 176 and a seal ring 237. An additional dynamic seal 238 disposed between housing 206 and shaft 176 cooperates with the aforementioned seals to prevent leakage of fluid from one end of the assembly. A filler plug 239 may be removed to fill the assembly with working fluid. At the opposite end of the assembly a seal ring 240 is disposed between housing 206 and housing cover 227 and a pair of dynamic seals 241 and 242 disposed within an axial annular boss 243 of housing cover 227 prevent leakage of fluid along shaft 176.

Housing 206 and housing cover 227 have pulley flanges 244 and 245, respectively, formed thereon, the pulley halves cooperating in assembled relationship to form a power delivery pulley 246 for driving a belt 247.

In this third embodiment of the invention, the pump intake flow control valve 210 is fixed to the pump end plate 183 and is not driven directly by the power input shaft 176. Valve 210 is operated by the differential pressure set up in the working fluid passing through the hydrostatic transmission, and the metering gap 215, acting as a flow orifice.

Pump rotor 179 is driven at input speed at all times, and the pump displacement is twice the motor displacement. The pump cam ring 182 has two lobes and the motor cam ring 198 has four lobes. Due to the displacement ratio of pump to motor and the cam ring lobe ratios employed, the motor rotor is driven at twice the input speed in a first input speed range of from zero to 750 r.p.m. Valve 210 is a circular reed type valve acted upon by the differential pressure set up by working fluid passing through the hydrostatic transmission and the metering gap 215 represented by the space between the outer periphery of the circular reed valve and the edge of pump end plate 183. At zero input speed there is no differential pressure and no deflection of the circular reed valve 210. The reed valve 210 stands upright and perpendicular to shaft 176 so that the pump intake gap 215 between valve 210 and pump end plate 183 is maximum. So long as the pump-motor system is completely filled with working fluid, the motor speed will be twice pump speed. If, by means of pump intake metering, less fluid is pumped, the motor speed will decrease relative to pump speed. Valve 210 is constructed of material of suitable thickness and stiffness that in the input speed range of from zero to 750 r.p.m. the deflection of the outer periphery of the valve will be slight. For example, assuming an initial or maximum flow control gap of .054 inch between the outer periphery of valve 210 and the pump end plate 183 at zero input speed, and input speed is raised to 750 r.p.m., the differential pressure acting upon the diaphragm or circular reed valve 210 will rise from zero to .61 pound per square inch and the diaphragm will deflect .0135 inch, reducing the metering gap at the outer periphery of the diaphragm to .0405 inch.

An increase in input speed above 750 r.p.m. increases the differential pressure and reduces the inlet gap and motor rotor speed. In the speed range between 750–1500 input speed, the diaphragm valve will progressively decrease the flow control gap until at 1500 r.p.m. and with a differential pressure of 2.44 pounds per square inch the outer periphery of the valve will have travelled the remaining .0405 inch to reduce the flow control gap to zero. At 1500 r.p.m. no working fluid is pumped, resulting in a motor speed of three fourths input speed, the drive being through the eccentric gearing and sprag clutch. Change of reservoir fluid pressure due to centrifugal force acting on the fluid does not affect the metering of the working fluid.

At speeds up to 1500 r.p.m. input speed due to the operation of the hydrostatic transmission unit, the pulley housing and outer race of the one-way clutch rotate faster than the reduction gearing driven inner race of the one-way clutch, and the clutch is released. In the input speed range of from zero to 1500 r.p.m. pump input speed, the output speed reduces from a maximum of twice input speed to a minimum of three quarters input speed as the input speed increases. The cam ring assembly does not rotate in this input speed range.

In the speed range from 1500 to 4500 r.p.m. input speed, the differential speed between the pump and motor rotor may be one fourth times input speed or 375 to 1125 r.p.m. Friction and pumping drag over this range may result in the cam ring assembly being rotated at a speed less than one-half this differential speed of 375 to 1125 r.p.m. or 187.5 to 562.5 r.p.m.

FIGURE 12 is a graph illustrating the performance of an accessory drive of the types shown in FIGURES 2 through 6 and 10 and 11 incorporating eccentric gearing.

With the engine stopped, the pump inlet control valve is fully open and remains fully open at engine idle speed and up to 750 r.p.m. engine speed. In the speed range between 750 r.p.m. and 1500 r.p.m. the pump inlet valve progressively decreases the pump inlet area until at 1500 r.p.m. the valve is fully closed. At engine speeds up to 750 r.p.m. the ratio of output speed to input speed is 2 to 1, since the pump capacity is twice the motor capacity. In the speed range from 750 r.p.m. to 1500 r.p.m. input speed, the flow control valve progressively blocks off supply of fluid to the pump until at 1500 r.p.m. input speed the pump suction is blocked off. In the speed range 750 to 1500 r.p.m. input speed the speed ratio of output speed to input speed decreases from 2 to 1 to .76 to 1, or to the drive ratio of the eccentric gearing which becomes effective when hydraulic drive is transmitted by fully closing the pump intake control valve. At speeds above 1500 r.p.m., the drive ratio is constant.

FIGURE 13 is a graph illustrating the performance of the accessory drive of the type shown in FIGURES 7 through 9 where the eccentric gearing is eliminated for the sake of cost reduction.

At input speeds up to 750 r.p.m. the pump intake control valve remains fully open and the ratio of output speed to input speed is 2 to 1 since the pump capacity is twice the motor capacity. In the speed range from 750 to 1500 r.p.m. input speed the valve moves toward its closed position to progressively restrict the inlet to the pump. The speed ratio drops off to 1 to 1 at 1500 r.p.m. input speed. At speeds above 1500 r.p.m. with the pump intake valve fully closed, the speed ratio of output speed continues to decrease with increase of input speed. The rate of decrease or downward slope of the curve at speeds above 1500 r.p.m. is determined by the size of the remaining pump intake area after the valve is closed. As shown in FIGURE 13, the drive ratio drops off to .75 to 1 at 4500 r.p.m. input speed with the selected remaining pump intake area effective after the valve is closed. By simply selecting the proper area through the intake valve after the valve is closed, any desired rate of change of drive ratio may be had.

It will be apparent that in all three modifications, the pump end plate, pump cam ring, the manifold plate, motor cam ring and motor end plate are all bolted together to make a free floating unit within the fluid reservoir formed by the power delivery housing. In all three versions, means are provided to progressively block off or restrict fluid intake to the pump in response to increase of speed of rotation of the input shaft, to decrease the output speed relative to input speed as the input speed increases.

The arrangement wherein the pump and motor are axially speed within the power output housing provides a compact assembly readily adapted for use in installation where space limitations are critical. The assembly is particularly useful for driving accessories of automotive vehicles such as generators, fans, power steering pump, and refrigerant compressors for air conditioning where it is desirable that the accessories be driven at a relatively high speed with respect to engine speed at low engine speeds and at slower speeds relative to engine speed as engine speed increases.

The arrangement wherein the rotating housing is provided with a series of fins throughout its axial length results in highly efficient cooling of the fluid within the housing and prevention of over-heating even at long intervals of operation at idle speed.

The arrangement whereby the pump cam ring, manifold plate and motor cam ring are bolted together to form a free floating assembly in the fluid reservoir is likewise believed novel.

I claim:

1. A variable speed drive unit comprising a power input shaft adapted to be driven at variable speeds of rotation, a power delivery housing supported for rotation upon said power delivery shaft and enclosing a fluid reservoir, a vane type pump, a vane type motor, said pump including a pump rotor driven by said input shaft for carrying pump vanes and a pump cam ring contacted by said pump vanes, an end plate at one side of said pump, a manifold plate disposed between said pump and motor having passages for conducting fluid from said pump to said motor for driving said motor, said motor including a vane rotor having vanes therein and contacting a motor cam ring, said motor rotor being effective to rotate said housing, a motor end plate at one side of said motor, means connecting said pump end plate, pump cam ring, manifold plate, motor cam ring and motor end plate to each other for rotation as a unit, and valve means for controlling the admission of fluid from said reservoir to said pump.

2. A variable speed drive unit comprising a power input shaft adapted to be driven at variable speeds of rotation, a power delivery housing supported for rotation upon said input shaft and forming a fluid reservoir containing working fluid, a vane type pump having a vane rotor driven by said input shaft and a pump cam ring disposed in said reservoir, an end plate at one side of said pump having a passage therethrough for admitting fluid from said reservoir to the inlet of said pump, a vane type motor coaxial with said pump having a motor vane rotor connected to drive said housing and having a motor cam ring, a manifold plate disposed between said pump and motor for conducting pump discharge fluid to said motor, a motor end plate having passages therethrough for conducting fluid from said motor to said reservoir, means for rigidly connecting said pump end plate, pump cam ring, manifold plate, motor cam ring and motor end plate to each other for rotation as a unit, and valve means for controlling the rate of flow of fluid from said reservoir to the intake side of said pump.

3. A variable speed drive unit comprising a power input shaft adapted to be driven at variable speeds of rotation, a power delivery housing rotatably supported on said input shaft and forming a reservoir containing working fluid, a pump driven by said input shaft, a motor driven by fluid discharged by said pump and connected to drive said housing, valve means for controlling the admission of fluid from said reservoir to said pump and movable from a position wherein the fluid inlet to said pump is substantially unrestricted to a position wherein the fluid inlet to the pump is blocked off and means for driving said housing when said valve is in said last-mentioned position comprising a first gear driven by said input shaft and a second gear in mesh with said first-mentioned gear, and including a one-way clutch for transmitting torque from said second gear to said housing.

4. A variable speed drive unit comprising a power input shaft adapted to be driven at variable speeds of rotation, a housing supported for rotation on said input shaft and enclosing a reservoir containing working fluid, a pump driven by said input shaft, an end plate adjacent said pump, a motor for driving said housing, a manifold plate positioned between said pump and motor for conducting fluid discharged by said pump to said motor for driving the same, a fluid inlet passage through said pump end plate for admitting fluid from said reservoir to said pump, and means for controlling the flow of fluid from said reservoir to said pump comprising a disc valve plate disposed coaxial with said pump end plate inlet passage and spaced axially therefrom to form with said pump and plate a chamber in fluid flow relationship with said reservoir, said disc valve plate being movable by fluid pressure said reservoir to increasingly restrict the fluid flow from said reservoir to said chamber as the speed of rotation of said pump increases.

5. A variable speed drive unit comprising a power input shaft adapted to be driven at variable speeds of rotation, a power delivery housing supported for rotation on said input shaft and enclosing a reservoir containing working fluid, a pump driven by said input shaft, an end plate adjacent said pump having a fluid inlet passage therethrough for admitting fluid from said reservoir to said pump, a disc valve supported upon said input shaft and normally spaced from said end plate to permit unrestricted flow of fluid from said reservoir to said pump, a governor driven by said input shaft effective in response to increase in speed of rotation of said input shaft above a predetermined speed of rotation to move said disc valve to restrict the inlet of fluid to said pump, a motor coaxial with said pump, a manifold plate between said pump and motor for distributing fluid from said pump to said motor, means connecting said motor to said housing for driving said housing, and an end plate for said motor having passages therethrough for discharging fluid from said motor to said reservoir.

6. A variable speed drive unit comprising a power input shaft, a housing rotatably supported on said input shaft, hydraulic drive means for driving said housing in a predetermined range of speed of rotation of said input shaft, said hydraulic means including a pump driven by said input shaft and a motor connected to drive said housing and driven by fluid discharged by said pump, means effective throughout said predetermined speed range of rotation of said input shaft to increasingly restrict flow of fluid to said pump, and mechanical means for driving said housing upon increase of speed of rotation of said input shaft to speeds above the maximum speed of said predetermined speed range, said mechanical means including gearing driven by said power input shaft and a one-way clutch having one race thereof driven by said gearing and a second race thereof fixed for rotation with said housing.

7. A variable speed drive unit comprising a power input shaft adapted to be driven at variable speeds of rotation, a cylindrical housing supported for rotation on said input shaft and forming a fluid reservoir containing working fluid, a hydraulic drive assembly for driving said housing throughout a predetermined speed range of rotation of said input shaft, said hydraulic drive assembly including a vane type pump having vanes driven by said input shaft and contacting a cam ring, and a vane type motor, said motor including vanes connected to drive said housing and a cam ring contacting said vanes, a pump end plate having a passage therethrough for admitting fluid from said reservoir to said motor, a manifold plate disposed between said pump and motor for conducting fluid under pressure from said pump to said motor for driving said motor, a motor end plate having a passage therein for discharging fluid from said motor to said reservoir, means connecting said pump end plate, pump cam ring, manifold plate, motor cam ring and motor end plate together to form a free floating assembly in said reservoir, and valve means for controlling the admission of fluid from said reservoir to said pump to vary the drive ratio, said valve being effective in a first predetermined speed range of rotation of said input shaft to permit unrestricted fluid flow from said reservoir to said pump, and movable at speeds of rotation of said input shaft above said predetermined speed range to restrict the flow of fluid from said reservoir to said pump to decrease the speed of said motor relative to the speed of rotation of said input shaft.

8. A variable speed drive unit comprising a power input shaft adapted to be driven at variable speeds of rotation, a cylindrical housing rotatably supported on said input shaft and enclosing a reservoir containing working fluid, a pump having an element driven by said input shaft and a cam ring, an end plate coaxial with said pump and having an opening therethrough for admitting fluid from said reservoir to said pump, a motor disposed in coaxial relationship with said pump having a power delivery element connected to drive said housing and a cam ring, a manifold plate disposed between said motor and pump for conducting fluid from said pump to said motor for driving said motor, a motor end plate having an opening therethrough for discharging fluid from said motor to said reservoir, means connecting said pump end plate, pump cam ring, manifold plate, motor cam ring and motor end plate to each other for rotation as a unit with respect to said input shaft, a disc valve coaxial with said pump end plate opening for controlling fluid flow from said reservoir to said pump through said pump end plate opening, said disc valve being effective throughout a first relatively slow predetermined speed range of rotation of said input shaft to permit unrestricted fluid flow from said reservoir to said pump through said pump end plate opening, said valve being movable in a relatively higher speed range of rotation of said input shaft to progressively restrict flow of fluid from said reservoir to said pump through said pump end plate opening, and mechanical means including a one-way clutch disposed between said power input shaft and said housing for driving said housing when said disc valve is positioned for maximum restriction of flow of fluid from said reservoir to said pump.

9. A variable speed drive unit comprising a power input shaft adapted to be driven at variable speeds of rotation, a cylindrical housing rotatably supported on said input shaft and enclosing a reservoir containing fluid, a pump having an element driven by said input shaft and a cam ring, an end plate coaxial with said pump having an opening therethrough for admitting fluid from said reservoir to said pump, a motor disposed coaxial with said pump having a rotor connected to drive said housing and a cam ring, a manifold plate disposed between said pump and motor for conducting fluid from said pump to said motor for driving said motor, a motor end plate having an open therethrough for discharging fluid from said motor to said reservoir, means connecting said pump end plate, pump cam ring, manifold plate, motor cam ring and motor end plate together to form an assembly thereof freely rotatable with respect to said input shaft and housing, valve means disposed axially adjacent to and spaced from said opening in said pump end plate for controlling the flow of fluid from said reservoir to said pump, a governor driven by said input shaft and operatively connected to said valve means for moving said valve means to increasingly restrict flow of fluid from said reservoir to said pump in response to increase in speed of rotation of said input shaft, drive means for driving said rotatable housing upon predetermined restriction of fluid flow to said pump including a one-way clutch and gearing driven by said input shaft for driving said rotatable housing through said one-way clutch.

10. A variable speed drive unit comprising a power input shaft adapted to be driven at variable speeds of rotation, a cylindrical housing rotatably supported on said input shaft and enclosing a reservoir containing fluid, a pump having one element driven by said input shaft, a motor coaxial with said pump having one element connected to said housing to drive said housing, a manifold plate between said pump and motor for distributing fluid from said pump to said motor, a pump end plate having an opening therethrough for admitting fluid from said reservoir to said pump, a valve positioned axially adjacent said pump end plate for controlling fluid inlet to said pump through said pump end plate opening, said valve being normally positioned to permit unrestricted fluid flow from said reservoir to said pump, a governor drive plate driven by said input shaft, governor weights pivoted to said drive plate and contacting said valve for moving said valve from a position of minimum restriction to fluid flow from said reservoir to said pump through said pump end plate opening to a position affording maximum restriction of fluid flow from said reservoir to said pump through said pump end plate opening.

11. A variable speed drive unit comprising a power input shaft adapted to be driven at variable speeds of rotation, a housing rotatably supported upon said shaft and enclosing a reservoir containing working fluid, a pump driven by said input shaft, a motor coaxial with said pump for driving said housing, a manifold plate between said pump and motor for distributing fluid from said pump to said motor for driving said motor, a pump end plate, an opening through said end plate for admitting fluid from said reservoir to said pump, a disc valve for controlling flow of fluid through said opening, a governor plate driven by said input shaft, governor weights pivoted to said governor plate, said governor weights acting on said disc valve to move said valve to increasingly restrict fluid flow through said pump end plate opening in response to increase in speed of rotation of said input shaft.

12. A variable speed drive unit comprising a power input shaft adapted to be driven at variable speeds of rotation, a power delivery housing rotatably supported upon said shaft and enclosing a reservoir containing working fluid, a pump driven by said input shaft, a motor coaxial with said pump for driving said housing, a manifold plate between said pump and motor for conducting fluid discharged by said pump to said motor for driving said motor, a pump end plate, an opening through said end plate for admitting fluid from said reservoir to said pump, a disc valve axially spaced from said end plate normally effective to permit unrestricted flow of fluid from said reservoir to said pump, an opening through said disc valve, a governor plate driven by said input shaft, governor weights pivoted to said governor plate for moving said disc valve to restrict fluid flow from said reservoir to said pump, and an opening through said governor plate effective when said valve is moved to its maximum fluid flow restricting position to permit fluid flow from said reservoir to said pump through said disc valve opening.

13. A variable speed drive unit comprising a power input shaft adapted to be driven at variable speeds of rotation, a power delivery housing rotatably supported upon said input shaft and enclosing a reservoir containing working fluid, a pump driven by said input shaft, a motor coaxial with said pump connected to said housing for driving said housing, a manifold plate for distributing fluid from said pump to said motor for driving said motor, a pump end plate having an opening therethrough for admitting fluid from said reservoir to said pump, a disc valve for controlling flow of fluid through said opening normally spaced from said opening for permitting unrestricted fluid flow to said pump, a governor drive disc disposed axially adjacent said disc valve and driven by said input shaft, governor weights pivoted to said governor disc and movable in response to a predetermined speed of rotation of said input shaft to position said disc valve in a position affording maximum restriction of fluid flow from said reservoir to said pump, and additional means for driving said housing when said input shaft is rotated at speeds above said predetermined speed, said additional drive means including reduction gearing driven by said input shaft and a one-way clutch between said reduction gearing and said housing and driven by said reduction gearing.

14. A variable speed drive unit comprising a power input shaft adapted to be driven at variable speeds of rotation, a power delivery housing rotatably supported on said input shaft and enclosing a reservoir containing working fluid, a pump driven by said input shaft, a motor coaxial with said pump connected to rotate said housing, a manifold plate between said pump and motor for distributing pump discharge fluid to said motor for driving said motor, a pump end plate, a fluid inlet opening through said end plate for admitting fluid from said reservoir to said pump, a disc valve coaxial with said end plate normally spaced from said end plate to provide a chamber adjacent to said pump end plate fluid inlet opening in fluid flow relationship with said reservoir, said pump being effective to draw fluid from said chamber through said pump end plate inlet opening to thereby reduce the fluid pressure in said chamber to a value less than the pressure of fluid in said reservoir, said disc valve being movable by fluid pressure in said reservoir to increasingly restrict the flow of fluid to said end plate opening in response to increase in speed of rotation of said pump, and means for mechanically driving said housing upon movement of said disc valve to its position of maximum fluid restriction including a one-way clutch having one race driven by said input shaft and a second race fixed for rotation with said housing.

References Cited by the Examiner
UNITED STATES PATENTS

| | | | |
|---|---|---|---|
| 2,891,419 | 6/59 | Badalini | 74—687 |
| 2,932,991 | 4/60 | Zierick | 74—687 X |
| 3,055,233 | 9/62 | Giles | 74—687 |
| 3,104,530 | 9/63 | Teichert. | |
| 3,108,437 | 10/63 | Zubaty et al. | |

DON A. WAITE, *Primary Examiner.*